(12) United States Patent
Chen (10) Patent No.: US 6,589,122 B1
(45) Date of Patent: Jul. 8, 2003

(54) THREAD TAPPING DEVICE

(76) Inventor: Mark Chen, 58, Ma Yuan West St., Taichung (TW)

( * ) Notice: Subject to any disclaimer, the term of this patent is extended or adjusted under 35 U.S.C. 154(b) by 0 days.

(21) Appl. No.: 10/099,383

(22) Filed: Mar. 18, 2002

(51) Int. Cl.[7] .................................................. B21J 13/02
(52) U.S. Cl. ........................ 470/185; 470/66; 470/67; 408/215
(58) Field of Search ........................ 470/57, 58, 66, 470/67, 80, 81, 185, 186; 408/215

(56) References Cited

U.S. PATENT DOCUMENTS

| | | | | |
|---|---|---|---|---|
| 3,688,323 A | * | 9/1972 | Bruck et al. | 470/209 |
| 4,150,450 A | * | 4/1979 | Laub et al. | 470/209 |
| 5,060,330 A | * | 10/1991 | Stahl | 470/209 |
| 5,224,900 A | * | 7/1993 | Hai | 470/185 |
| 5,647,803 A | * | 7/1997 | Killer | 470/67 |

* cited by examiner

Primary Examiner—Ed Tolan (57) ABSTRACT

A thread tapping device has a main seat, a rotating head, a handle rod, an adjustment rod, a pivot connector, and a pair of scrape blades. The main seat has a V-shaped groove, a bottom pivot hole, a through aperture, two connection bars, and an end block. The rotating head is disposed on the handle rod and inserted in the bottom pivot hole of the main seat. The adjustment rod has an upper lug and an outer threaded portion inserted in the rotating head. The pivot connector has a round aperture, a circular aperture, and a lower groove to receive the upper lug of the adjustment rod. Each scrape blade is disposed between the end block and one of the connection bars.

2 Claims, 9 Drawing Sheets

THREAD TAPPING DEVICE

BACKGROUND OF THE INVENTION

The present invention relates to a thread tapping device. More particularly, the present invention relates to a thread tapping device which is operated easily.

Figure 1:
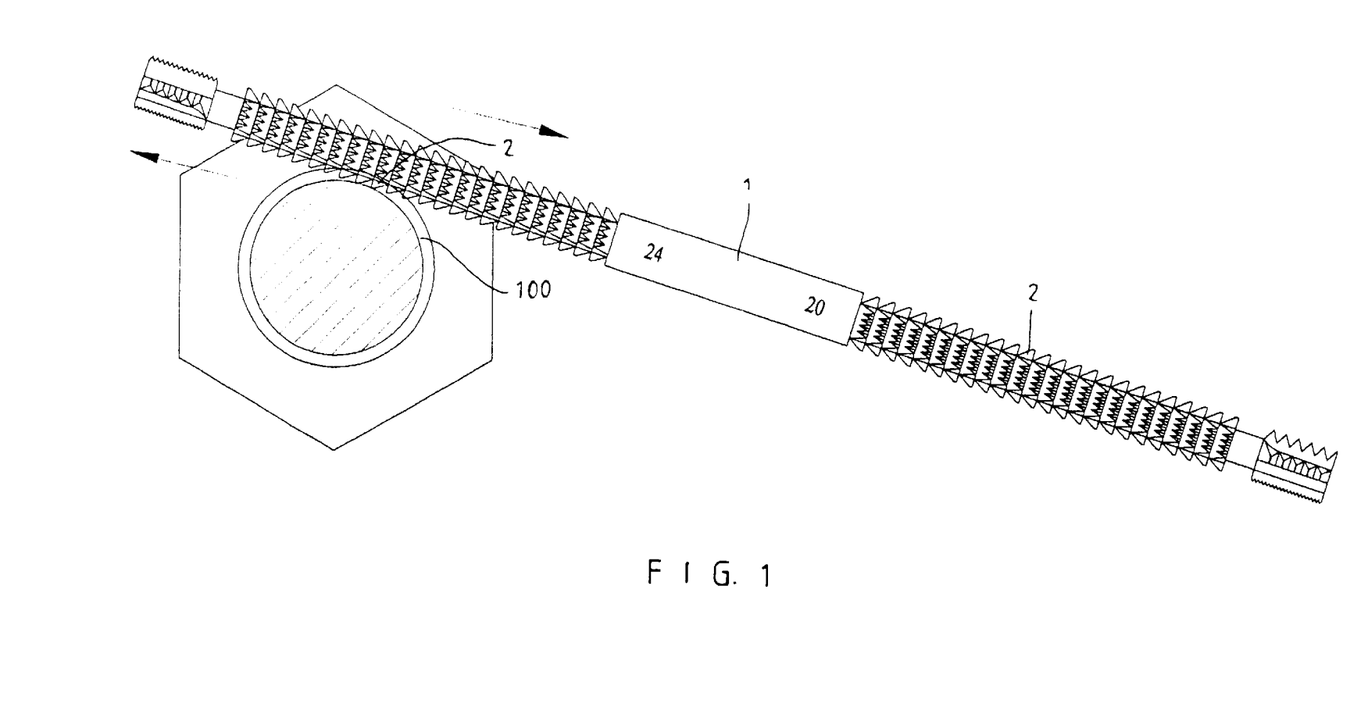
FIG. 1 is a schematic view illustrating a conventional thread tapping device of the prior art is operated.
Figure 2:
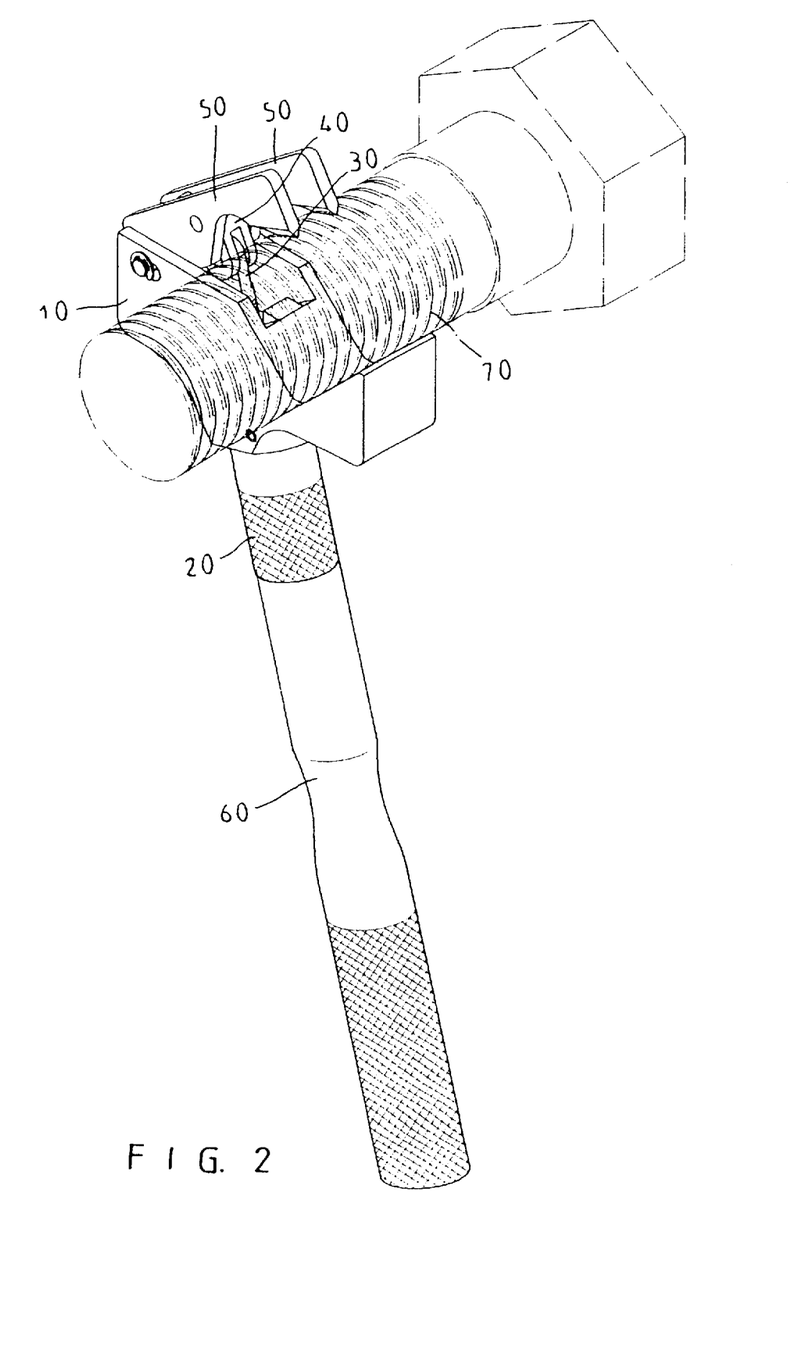
FIG. 2 is a perspective assembly view of a thread tapping device of a preferred embodiment in accordance with the present invention.
Figure 3:
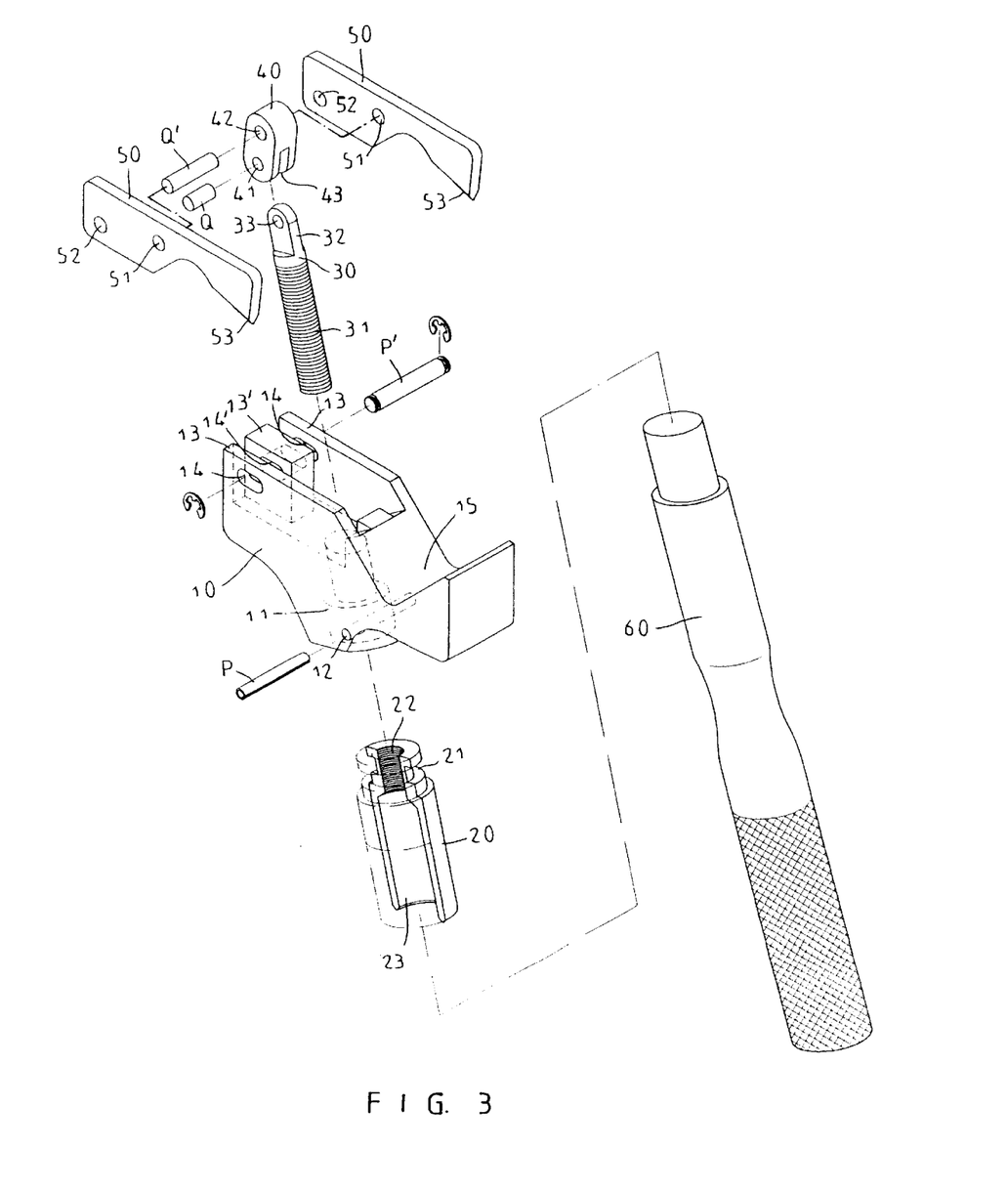
FIG. 3 is a perspective exploded view of a thread tapping device of a preferred embodiment in accordance with the present invention.
Figure 4:
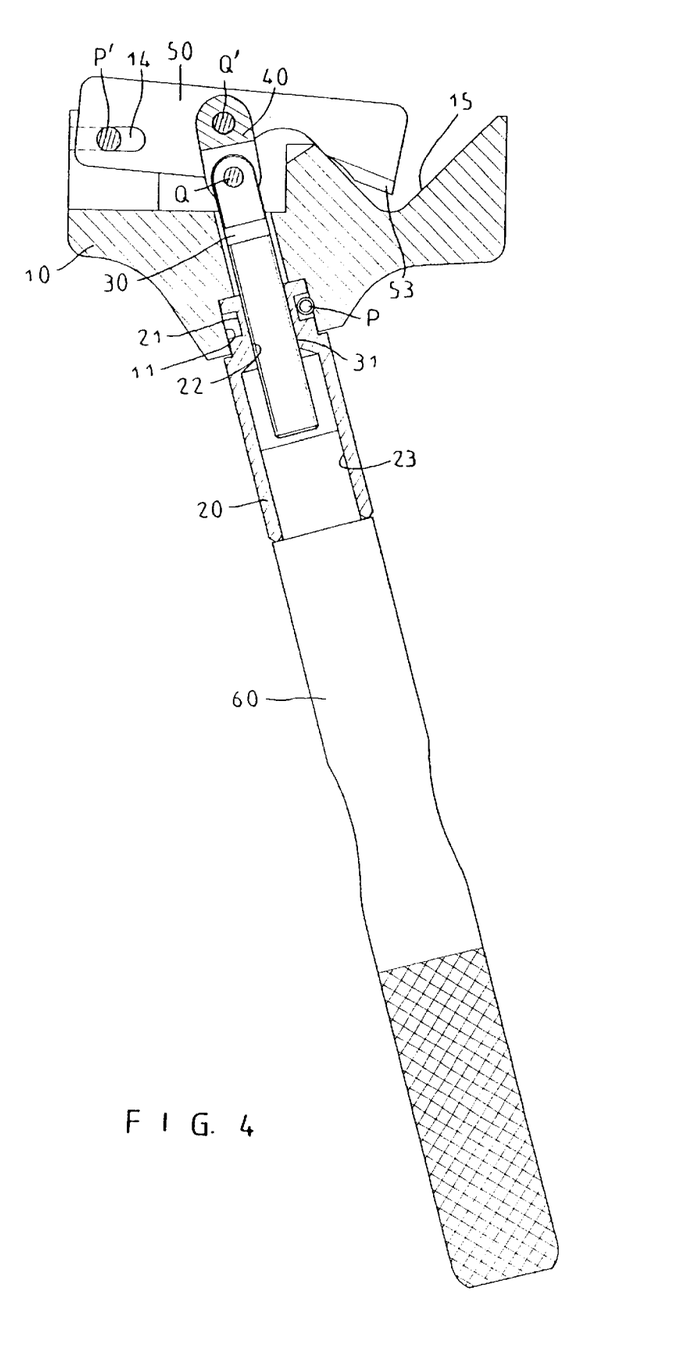
FIG. 4 is a sectional assembly view of a thread tapping device of a preferred embodiment in accordance with the present invention.
Figure 5:
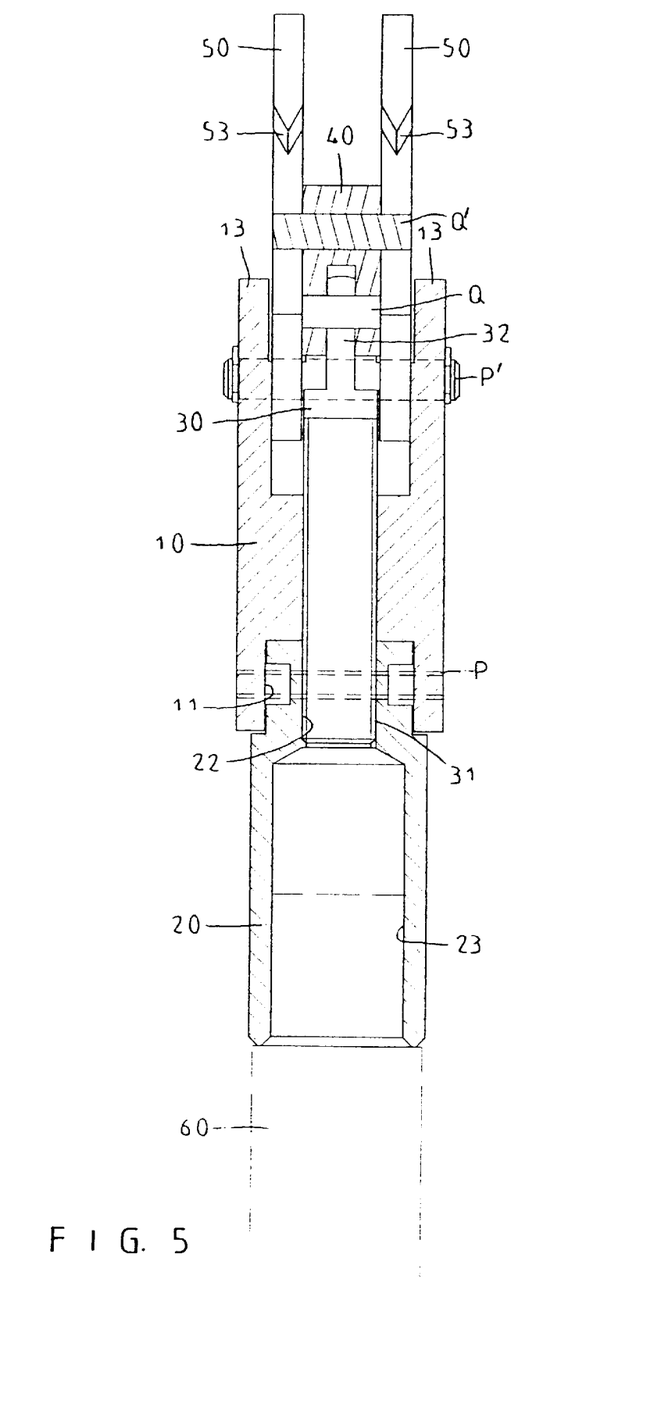
FIG. 5 is another sectional assembly view of a thread tapping device of a preferred embodiment in accordance with the present invention.
Figure 6:
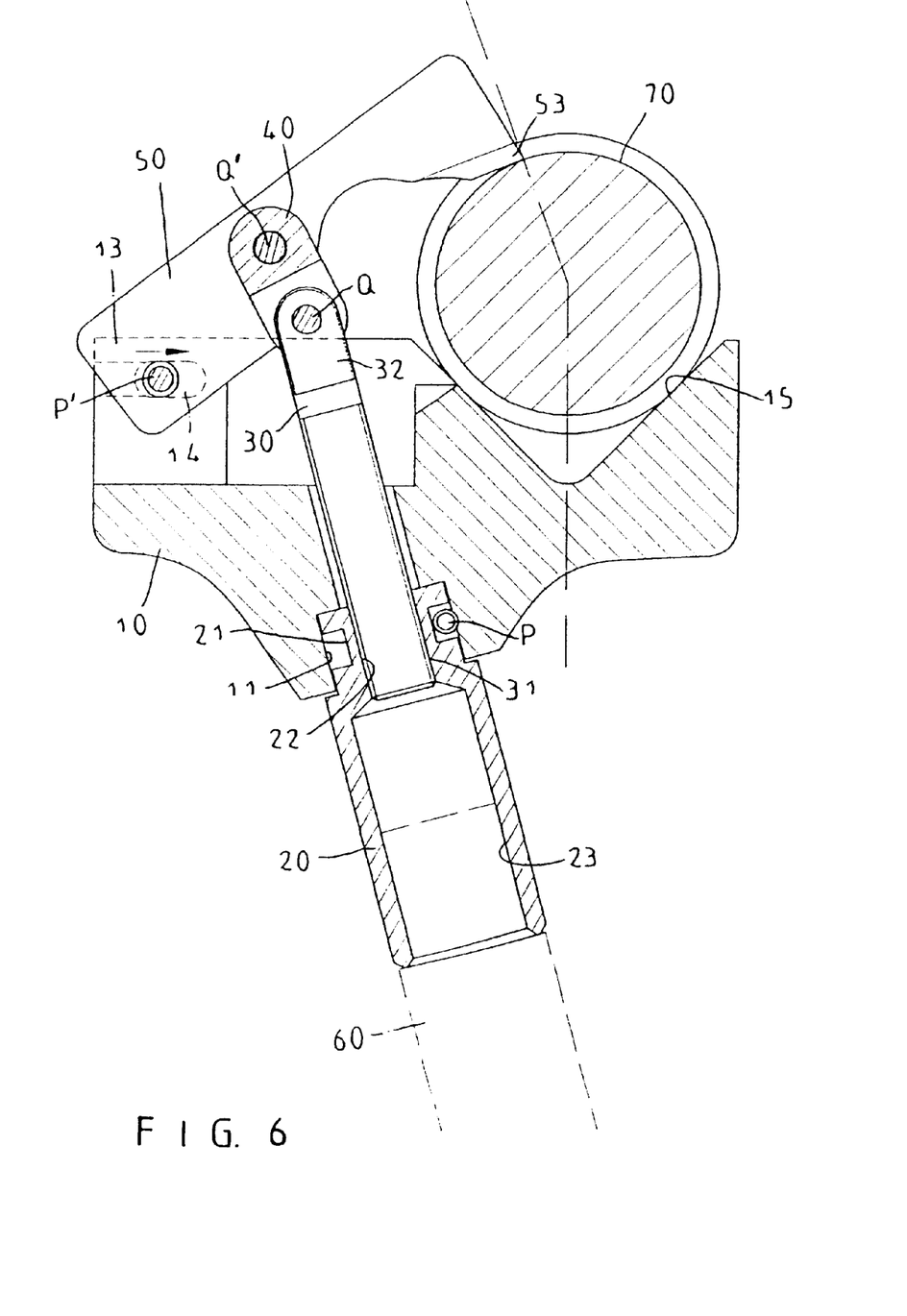
FIG. 6 is a sectional schematic view illustrating an operation of a thread tapping device of a preferred embodiment in accordance with the present invention.
Figures 7, 7A:
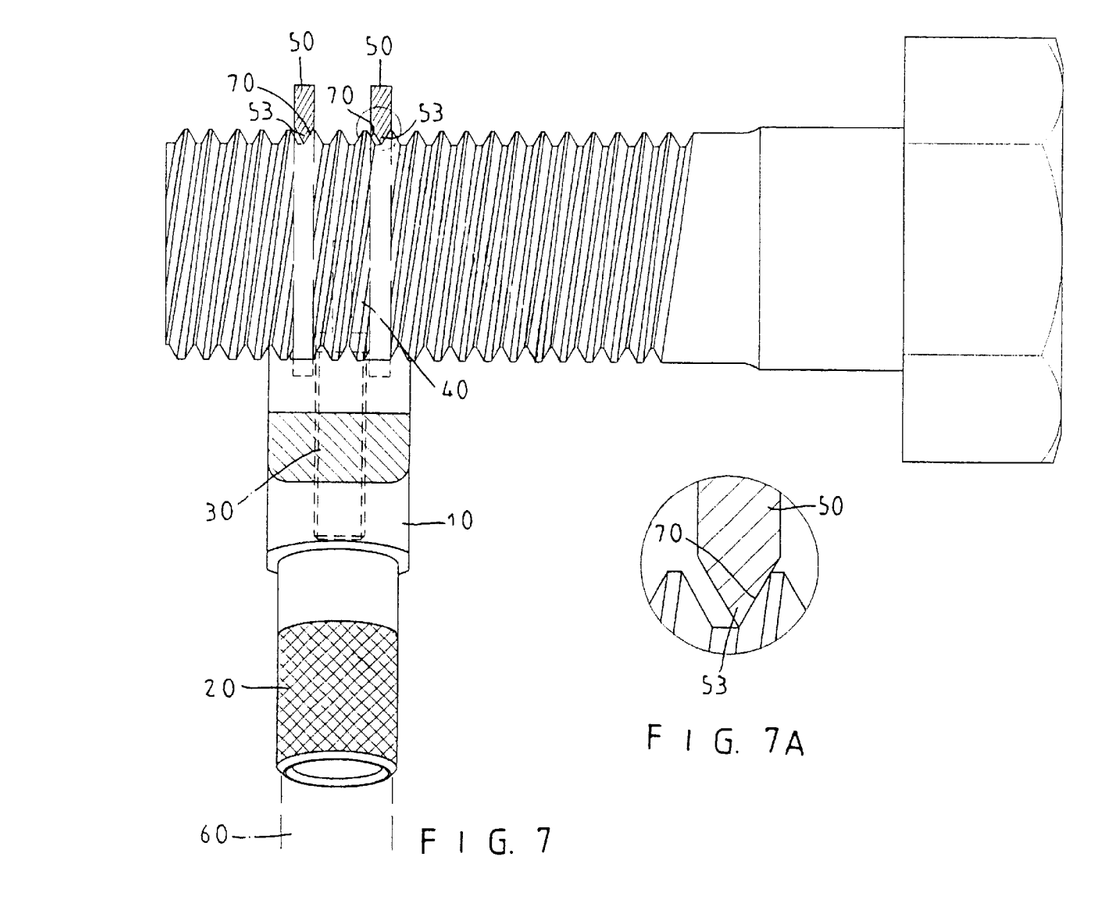
FIG. 7 is a sectional schematic view illustrating an application of a thread tapping device of a preferred embodiment in accordance with the present invention.
FIG. 7A is a partially enlarged view of FIG. 7.
Figure 8:
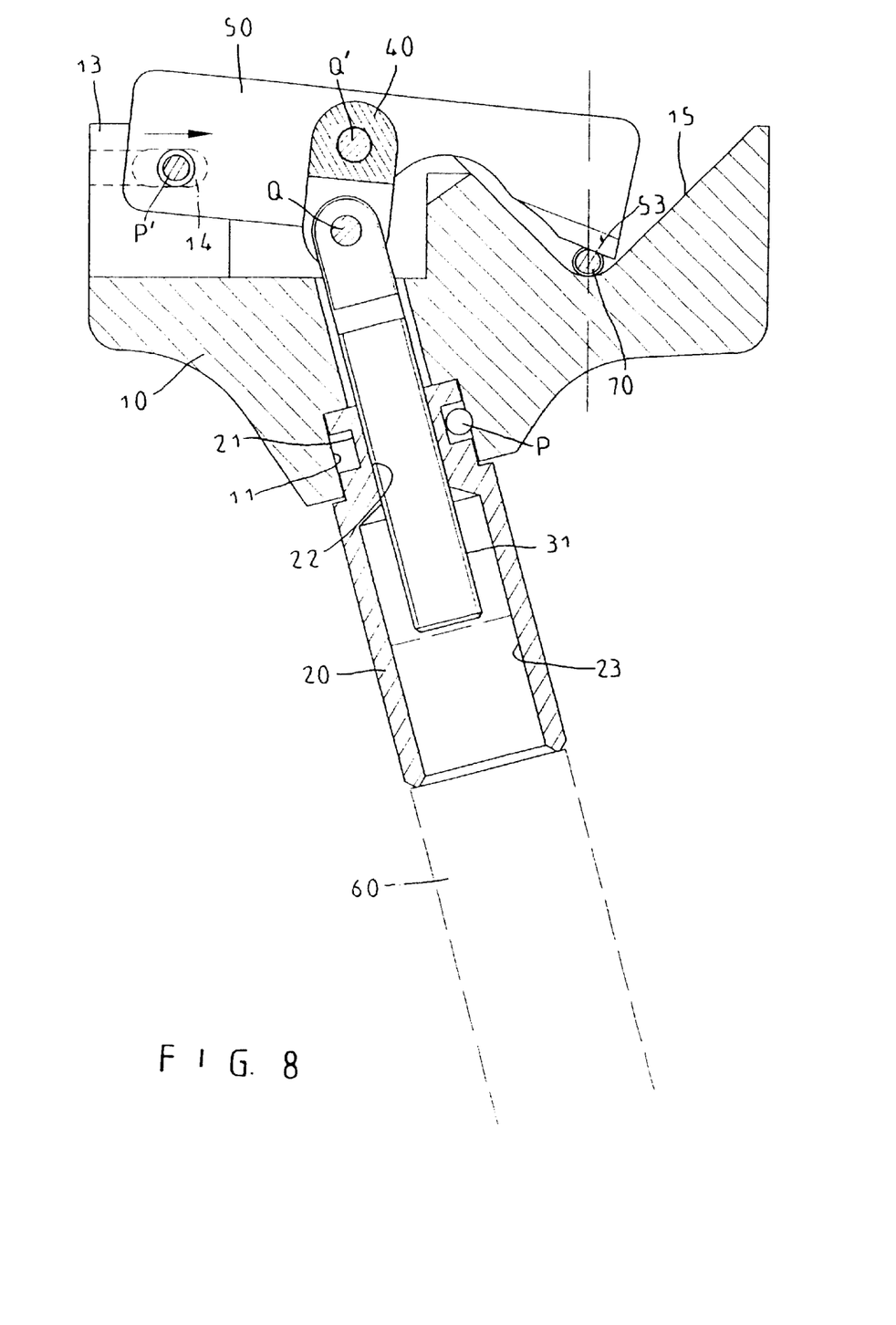
FIG. 8 is a sectional schematic view illustrating another operation of a thread tapping device of a preferred embodiment in accordance with the present invention.
Figure 9:
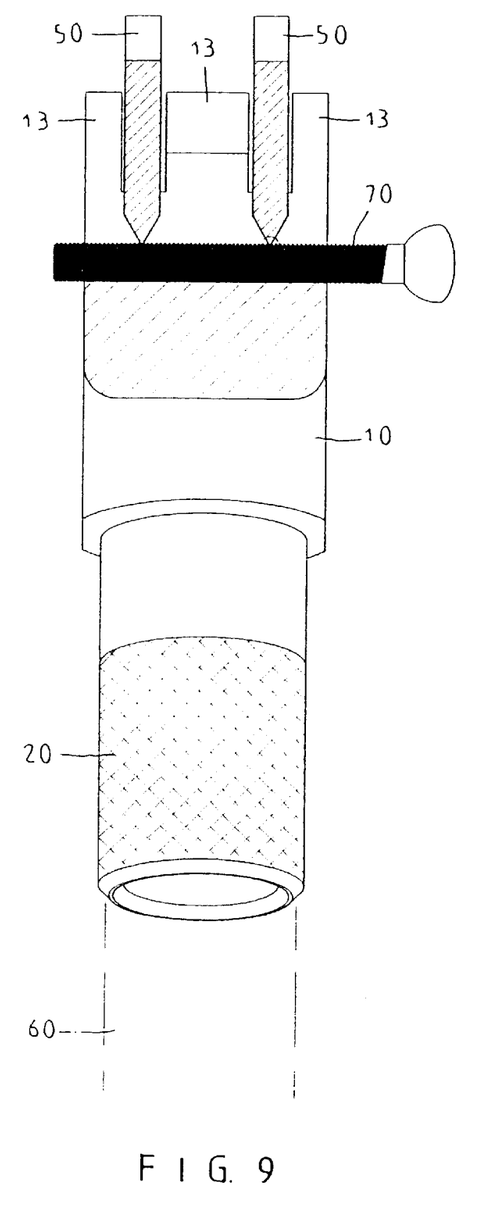
FIG. 9 is a sectional schematic view illustrating another application of a thread tapping device of a preferred embodiment in accordance with the present invention.
Figure 9A:
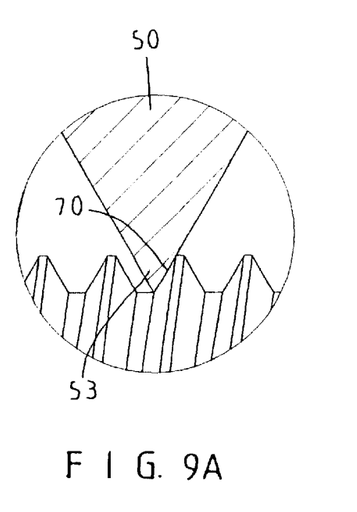
FIG. 9A is a partially enlarged view of FIG. 9.

Referring to FIG. 1, a conventional thread tapping device 1 has a plurality of scrape teeth 2 to shape damaged threads on a bolt 100. If the conventional thread tapping device 1 is not operated precisely, the damaged threads on the bolt 100 will be damaged by the conventional thread tapping device 1.

SUMMARY OF THE INVENTION

An object of the present invention is to provide a thread tapping device which has a V-shaped groove to receive a bolt in order to hold the bolt stably while the thread tapping device shapes damaged threads on the bolt.

Accordingly, a thread tapping device comprises a main seat, a rotating head, a handle rod, an adjustment rod, a pivot connector, and a pair of scrape blades. The main seat has a V-shaped groove, a bottom pivot hole, a through aperture communicating with the bottom pivot hole, two connection bars, and an end block. Each connection bar has an oblong hole. The end block has an oblong aperture. The rotating head has an annular recess and an upper threaded hole. The rotating head is disposed on the handle rod. The rotating head is inserted in the bottom pivot hole of the main seat. The adjustment rod has an outer threaded portion and an upper lug having a pivot aperture. The outer threaded portion of the adjustment rod is inserted in the upper threaded hole of the rotating head. The pivot connector has a round aperture, a circular aperture, and a lower groove to receive the upper lug of the adjustment rod. Each scrape blade has a round hole, a circular hole, and a lower edge. Each scrape blade is disposed between the end block and one of the connection bars. A first pin is inserted in the through aperture of the main seat. A second pin is inserted through each oblong hole of each connection bar, the oblong aperture of the end block, and each circular hole of each scrape blade. A third pin is inserted through the round aperture of the pivot connector and the pivot aperture of the adjustment rod. A fourth pin is inserted through each round hole of each scrape blade and the circular aperture of the pivot connector.

DETAILED DESCRIPTION OF THE INVENTION

Referring to FIGS. 2 to 9A, a thread tapping device comprises a main seat 10, a rotating head 20, a handle rod 60, an adjustment rod 30, a pivot connector 40, and a pair of scrape blades 50.

The main seat 10 has a V-shaped groove 15, a bottom pivot hole 11, a through aperture 12 communicating with the bottom pivot hole 11, two connection bars 13, and an end block 13'.

Each of the connection bars 13 has an oblong hole 14.

The end block 13' has an oblong aperture 14'.

The rotating head 20 has an annular recess 21, an upper threaded hole 22, and a lower hole 23.

The rotating head 20 is disposed on the handle rod 60.

The rotating head 20 is inserted in the bottom pivot hole 11 of the main seat 10.

The adjustment rod 30 has an outer threaded portion 31 and an upper lug 32 having a pivot aperture 33.

The outer threaded portion 31 of the adjustment rod 30 is inserted in the upper threaded hole 22 of the rotating head 20.

The pivot connector 40 has a round aperture 41, a circular aperture 42, and a lower groove 43 to receive the upper lug 32 of the adjustment rod 30.

Each of the scrape blades 50 has a round hole 51, a circular hole 52, and a lower edge 53.

Each of the scrape blades 50 is disposed between the end block 13' and one of the connection bars 13.

A first pin P' is inserted in the through aperture 12 of the main seat 10.

A second pin P' is inserted through each oblong hole 14 of each connection bar 13, the oblong aperture 14' of the end block 13', and each circular hole 52 of each scrape blade 50.

A third pin Q is inserted through the round aperture 41 of the pivot connector 40 and the pivot aperture 33 of the adjustment rod 30.

A fourth pin Q' is inserted through each round hole 51 of each scrape blade 50 and the circular aperture 42 of the pivot connector 40.

Referring to FIGS. 2 to 9A again, a thread 70 of a bolt is placed on the V-shaped groove 15 of the main seat 10. The rotating head 20 is rotated until the lower edge 53 of each scrape blade 50 engages with the thread 70 of the bolt.

Therefore, the bolt is held by the thread tapping device stably while the thread tapping device shapes damaged threads on the bolt.

The present invention is not limited to the above embodiment but various modification thereof may be made. Furthermore, various changes in form and detail may be made without departing from the scope of the present invention.

I claim:

1. A thread tapping device comprises:

a main seat, a rotating head, a handle rod, an adjustment rod, a pivot connector, and a pair of scrape blades, the main seat having a V-shaped groove, a bottom pivot hole, a through aperture communicating with the bottom pivot hole, two connection bars, and an end block, each said connection bar having an oblong hole, the end block having an oblong aperture, the rotating head having an annular recess and an upper threaded hole, the rotating head disposed on the handle rod, the rotating head inserted in the bottom pivot hole of the main seat, the adjustment rod having an outer threaded portion and an upper lug having a pivot aperture, the outer threaded portion of the adjustment rod inserted in the upper threaded hole of the rotating head, the pivot connector having a round aperture, a circular aperture, and a lower groove to receive the upper lug of the adjustment rod, each said scrape blade having a round hole, a circular hole, and a lower edge, each said scrape blade disposed between the end block and one of the connection bars, a first pin inserted in the through aperture of the main seat, a second pin inserted through each said oblong hole of each said connection bar, the oblong aperture of the end block, and each said circular hole of each said scrape blade, a third pin inserted through the round aperture of the pivot connector and the pivot aperture of the adjustment rod, and a fourth pin inserted through each said round hole of each said scrape blade and the circular aperture of the pivot connector.

2. The thread tapping device as claimed in claim 1, wherein the rotating head further has a lower hole.

* * * * *